(12) United States Patent
Balsiger et al.

(10) Patent No.: US 10,823,268 B2
(45) Date of Patent: Nov. 3, 2020

(54) INVERTED COMPOUND HARMONIC DRIVE

(71) Applicant: Hamilton Sundstrand Corporation, Windsor Locks, CT (US)

(72) Inventors: Derick S. Balsiger, Mayer, AZ (US); Nicholas R. Van De Veire, Tempe, AZ (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 681 days.

(21) Appl. No.: 15/229,921

(22) Filed: Aug. 5, 2016

(65) Prior Publication Data

US 2018/0038467 A1 Feb. 8, 2018

(51) Int. Cl.
*F16H 25/06* (2006.01)
*F16H 49/00* (2006.01)
*B64C 13/34* (2006.01)

(52) U.S. Cl.
CPC .......... *F16H 49/001* (2013.01); *B64C 13/34* (2013.01)

(58) Field of Classification Search
CPC .............................. F16H 49/001; B64C 13/34
USPC .......................................................... 74/640
See application file for complete search history.

(56) References Cited

U.S. PATENT DOCUMENTS

| | | | |
|---|---|---|---|
| 2,931,248 A * | 4/1960 | Walton | F16H 49/001 74/640 |
| 3,001,840 A * | 9/1961 | Walton | F16C 19/50 384/447 |
| 4,663,813 A | 5/1987 | Carlson | |
| 4,703,670 A | 11/1987 | Kondo | |
| 4,840,090 A | 6/1989 | Iwata | |
| 5,016,491 A * | 5/1991 | Poro | F16H 49/001 475/177 |
| 8,997,607 B2 * | 4/2015 | Kanai | F16H 49/001 74/640 |
| 9,157,517 B2 | 10/2015 | Lunin et al. | |
| 9,322,464 B2 | 4/2016 | Lin | |
| 2015/0354686 A1 | 12/2015 | Balsiger | |
| 2016/0010738 A1 | 1/2016 | Balsiger et al. | |
| 2016/0229525 A1 | 8/2016 | Van De Veire et al. | |

FOREIGN PATENT DOCUMENTS

| | | |
|---|---|---|
| DE | 29702710 U1 | 7/1998 |
| DE | 102008039943 A1 | 3/2010 |
| JP | 48-21048 * | 3/1973 |
| JP | S6174936 A | 4/1986 |

OTHER PUBLICATIONS

European Search Report for Application No. 17182921.1-1762; dated Dec. 20, 2017; Report Received Date: Dec. 21, 2017; 1-12 pages.

* cited by examiner

*Primary Examiner* — William C Joyce
(74) *Attorney, Agent, or Firm* — Cantor Colburn LLP

(57) ABSTRACT

A compound harmonic drive including: a first internal ring gear; a second internal ring gear, the second internal ring gear being coaxial to the first internal ring gear; a first external gear located within the first internal ring gear and coaxial to the first internal ring gear, the first external gear meshes with the first internal ring gear; and a second external gear located within the second internal ring gear and coaxial to the second internal ring gear, the second external gear meshes with the second internal ring gear. The first internal ring gear and the second internal ring gear are composed of a flexible material.

14 Claims, 4 Drawing Sheets

← 500

504
Positioning a first inner ring gear and an abutting second inner ring gear within a wave generator, the first inner ring gear, the second inner ring gear, and the wave generator being coaxial to each other

506
Positioning a first external gear within the first inner ring gear, the first external gear meshes with the first inner ring gear and is coaxial to the first inner ring gear

508
Positioning a second external gear within the second inner ring gear, the second external gear meshes with the second inner ring gear and is coaxial to the second inner ring gear

510
Connecting the first external gear to an output structure

512
Connecting the second external gear to ground

FIG. 5

INVERTED COMPOUND HARMONIC DRIVE

BACKGROUND

The subject matter disclosed herein generally relates to gear systems, and more specifically to gear systems suitable for use with geared actuators in aircraft.

Aircraft typically include flight control surfaces on aircraft wing structures that are moved and positioned in order to alter the lift characteristics of the wing structures. Actuators are coupled to the flight control surfaces and control and guide the movement of the flight control surfaces between positions. Generally, there are two types of actuators used in aircraft: linear actuators and rotary actuators. Conventionally, a rotary actuator uses an epicyclic-type reduction gear drive, commonly referred to as a planetary gear drive, to step down high speed rotation imputed by an electric drive motor. It is also common for a rotary actuator to use a planetary gear drive with multiple stages (multiple sets of planet gears) to increase the reduction ratio and torque-to-weight ratio of the planetary gear drive. While incorporating multiple stages into the planetary gear drive increases the reduction ratio and torque-to-weight ratio of the planetary gear drive, it also undesirably increases the size, weight, and complexity of the planetary gear drive.

Presently, the construction of aircraft wings is moving toward a thin-winged design, where the overall thickness of the wings is decreased from previous designs. Because the thickness of the wings is being decreased, it is becoming increasingly difficult to fit a conventional rotary actuator with a planetary gear drive within the cross-section of the wings, especially when the planetary gear drive incorporates multiple stages. The diameter of the planetary gear drive can be decreased in order to fit it within the reduced wing cross-section, however, the size of the teeth must also be decreased in order to maintain the high reduction ratio. Reducing the size of the teeth is undesirable because it lowers the torque-to-weight ratio of the planetary gear drive while also increasing the manufacturing tolerances and cost of the planetary gear drive.

SUMMARY

According to one embodiment, a compound harmonic drive is provided. The compound harmonic drive includes: a first internal ring gear; a second internal ring gear, the second internal ring gear being coaxial to the first internal ring gear; a first external gear located within the first internal ring gear and coaxial to the first internal ring gear, the first external gear meshes with the first internal ring gear; and a second external gear located within the second internal ring gear and coaxial to the second internal ring gear, the second external gear meshes with the second internal ring gear. The first internal ring gear and the second internal ring gear are composed of a flexible material.

In addition to one or more of the features described above, or as an alternative, further embodiments of the compound harmonic drive may include that the first external gear includes radially-outward-extending teeth that mesh with radially-inward-extending teeth of the first internal ring gear.

In addition to one or more of the features described above, or as an alternative, further embodiments of the compound harmonic drive may include the second external gear includes radially-outward-extending teeth that mesh with radially-inward-extending teeth of the second internal ring gear.

In addition to one or more of the features described above, or as an alternative, further embodiments of the compound harmonic drive may include that the first internal ring gear includes a different number of radially-inward-extending teeth than the second internal ring gear.

In addition to one or more of the features described above, or as an alternative, further embodiments of the compound harmonic drive may include that the first external gear includes a different number of radially-outward-extending teeth than the second external gear.

In addition to one or more of the features described above, or as an alternative, further embodiments of the compound harmonic drive may include a wave generator disposed radially outward from the first internal ring gear and the second internal ring gear and engaged with both the first internal ring gear and the second internal ring gear; and a bearing element radially interposed between the harmonic wave generator and the first internal ring gear and the second internal ring gear. The first internal ring gear and the second internal ring gear rotate in response to interaction between the wave generator, the first internal ring gear, the second internal ring gear, the first external gear, and the second external gear when the wave generator rotates.

In addition to one or more of the features described above, or as an alternative, further embodiments of the compound harmonic drive may include that the first internal ring gear and the second internal ring gear rotate at the same rate.

In addition to one or more of the features described above, or as an alternative, further embodiments of the compound harmonic drive may include that the first internal ring gear and the second internal ring gear are integral.

In addition to one or more of the features described above, or as an alternative, further embodiments of the compound harmonic drive may include that the first internal ring gear or the second internal ring gear is grounded.

According to another embodiment, a method of assembling a compound harmonic drive is provided. The method includes: positioning a first internal ring gear and a second internal ring gear within a wave generator, the first internal ring gear, the second internal ring gear, and the wave generator being coaxial to each other; positioning a first external gear within the first internal ring gear, the first external gear meshes with the first internal ring gear and is coaxial to the first internal ring gear; positioning a second external gear within the second internal ring gear, the second external gear meshes with the second internal ring gear and is coaxial to the second internal ring gear. The first internal ring gear and the second internal ring gear are composed of a flexible material.

In addition to one or more of the features described above, or as an alternative, further embodiments of the method may include: connecting the first external gear to an output structure; and connecting the second external gear to ground.

In addition to one or more of the features described above, or as an alternative, further embodiments of the method may include that the first external gear includes radially-outward-extending teeth that mesh with radially-inward-extending teeth of the first internal ring gear.

In addition to one or more of the features described above, or as an alternative, further embodiments of the method may include that the second external gear includes radially-outward-extending teeth that mesh with radially-inward-extending teeth of the second internal ring gear.

In addition to one or more of the features described above, or as an alternative, further embodiments of the method may include that the first internal ring gear includes a different number of radially-inward-extending teeth than the second internal ring gear.

In addition to one or more of the features described above, or as an alternative, further embodiments of the method may include that the first external gear includes a different number of radially-outward-extending teeth than the second external gear.

In addition to one or more of the features described above, or as an alternative, further embodiments of the method may include that the first internal ring gear and the second internal ring gear rotate at the same rate.

In addition to one or more of the features described above, or as an alternative, further embodiments of the method may include that the first internal ring gear and the second internal ring gear are integral.

Technical effects of embodiments of the present disclosure include inverting a compounding harmonic drive system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 5 is a flow process illustrating a method of manufacturing the compound harmonic drive of FIGS. 1-4, according to an embodiment of the present disclosure.

The detailed description explains embodiments of the present disclosure, together with advantages and features, by way of example with reference to the drawings.

DETAILED DESCRIPTION

Figure 1:
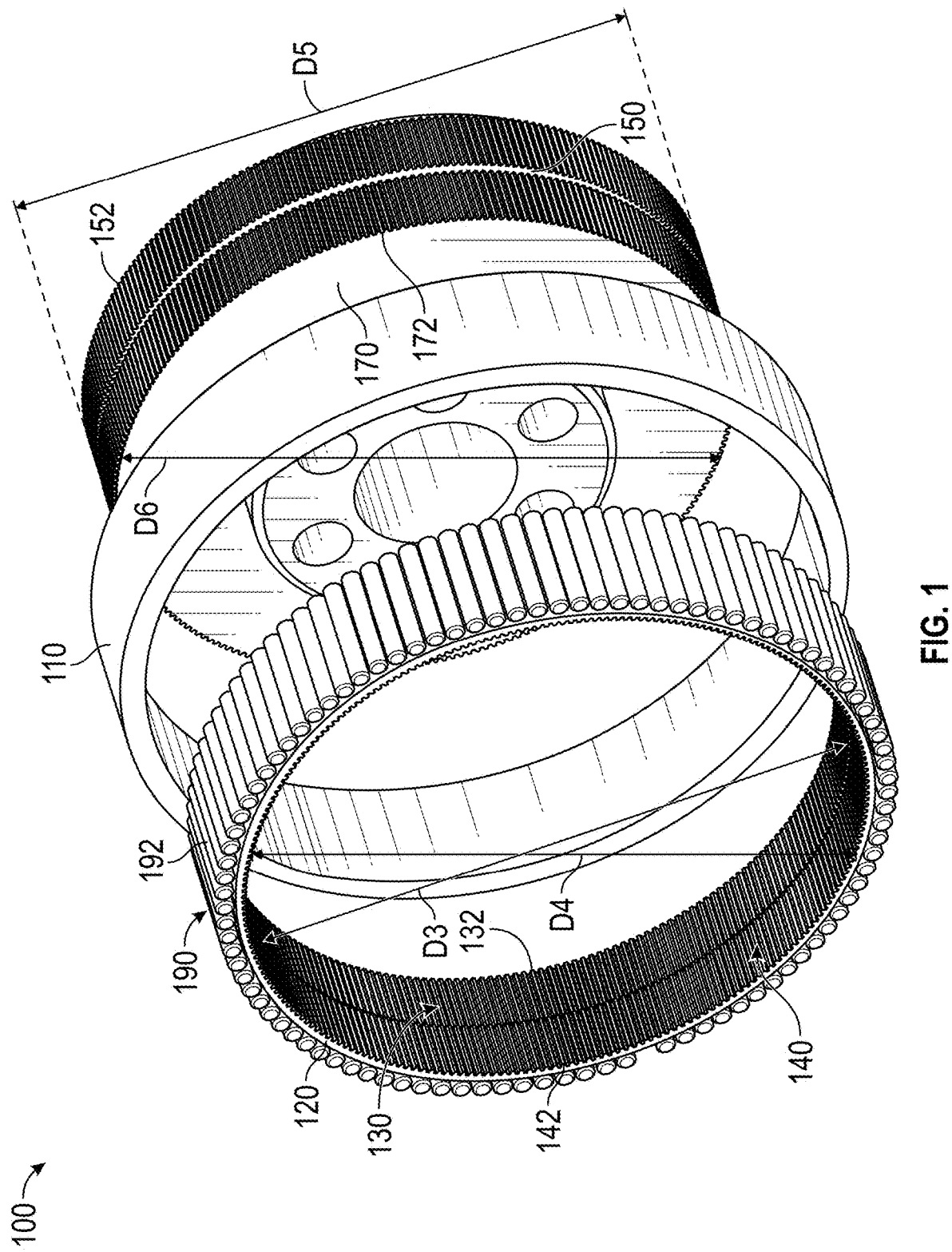
FIG. 1 is an exploded view of a compound harmonic drive, according to an embodiment of the present disclosure.
Figure 2:
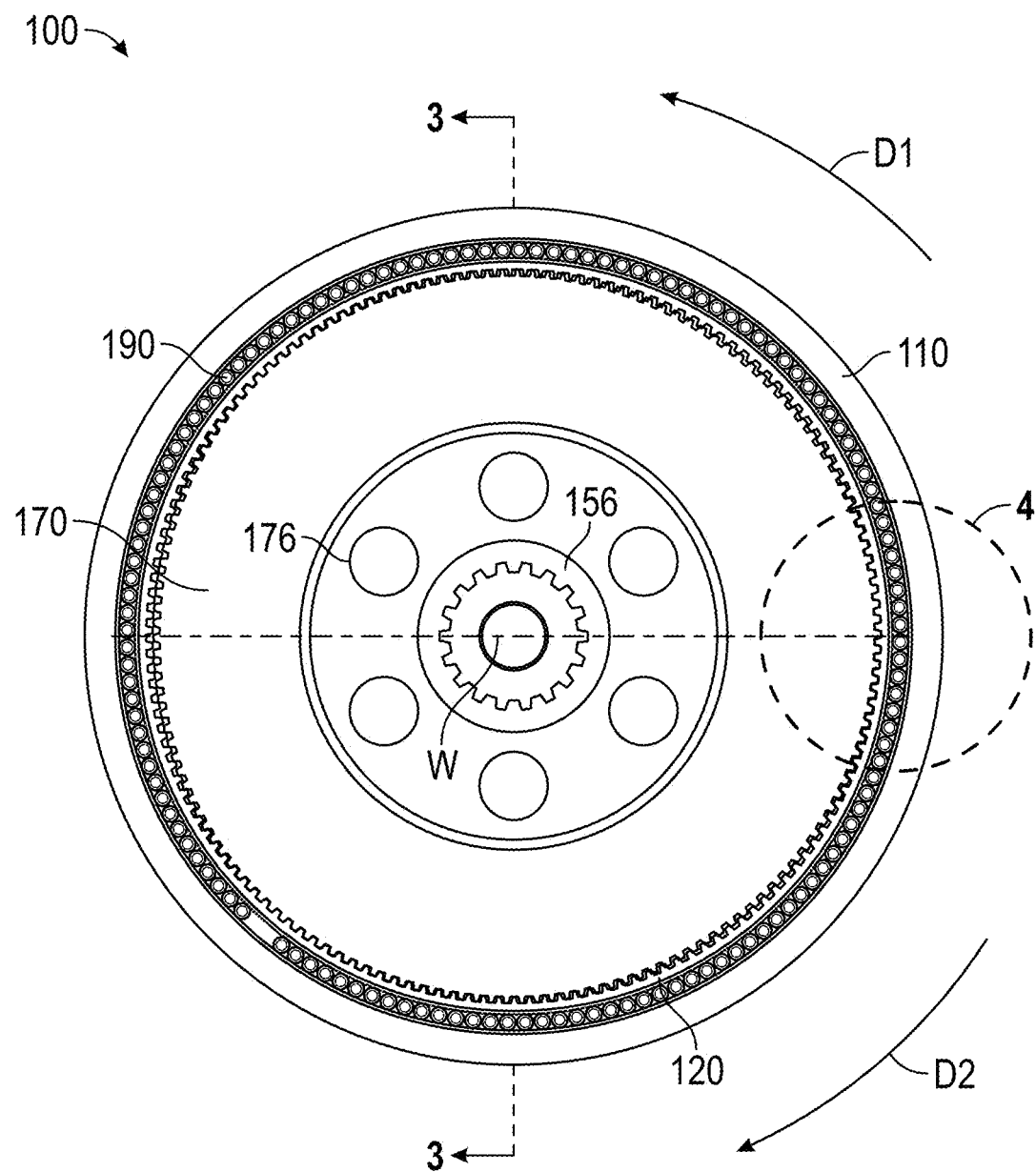
FIG. 2 is an axial cross-sectional view of the compound harmonic drive of FIG. 1, according to an embodiment of the present disclosure.

With reference to FIGS. 1-4, an inverted compound harmonic drive 100 is provided and includes a wave generator 110, a bearing element 190, a compound flex spline 120, a first external gear 150 and a second external gear 170. FIG. 1 is an exploded view of the compound harmonic drive 100, according to an embodiment of the present disclosure. FIG. 2 is an axial cross-sectional view of the compound harmonic drive 100, according to an embodiment of the present disclosure.

The wave generator 110 may be connected to an input, which and rotates wave generator 110 in a first direction D1 around an axis W. The input may be a device such as, for example, an electric drive motor, a hydraulic rotary drive, or other suitable torque source. The compound harmonic drive 100 may further include other components and features not specifically shown or discussed. The wave generator 110 has an elliptical or otherwise noncircular, as discussed further below.

Figure 3:
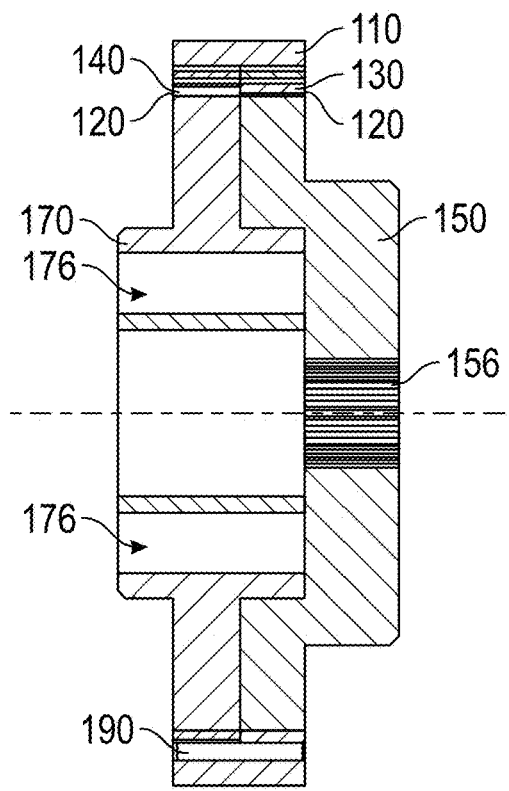
FIG. 3 is a side cross-sectional view of the compound harmonic drive of FIG. 1, according to an embodiment of the present disclosure.
Figure 4:
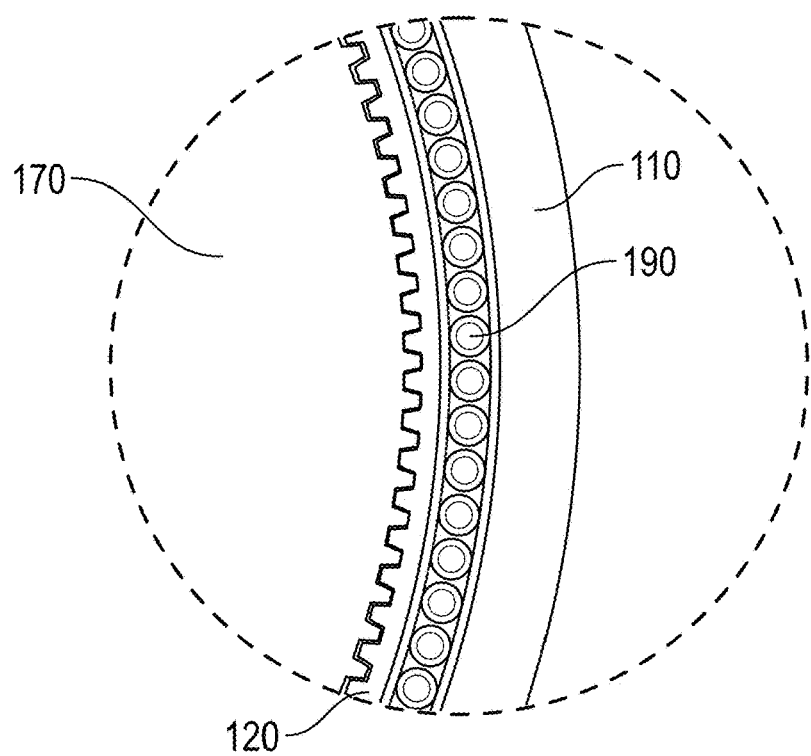
FIG. 4 is an enlarged axial cross-sectional view of FIG. 2, according to an embodiment of the present disclosure.

The compound flex spline 120 is smaller in diameter than the harmonic wave generator 110, and is coaxial with the harmonic wave generator 110. The compound flex spline 120 is located within (i.e. radially inward and surrounded by) the wave generator 110. The bearing element 190 is radially interposed between the harmonic wave generator 110 and the compound flex spline 120, as seen in FIGS. 3-4. The bearing element 190 may include a plurality of individual roller bearings 192. The bearing element 190 allows the compound flex spline 120 to rotate relative to the wave generator 110. When the bearing element 190 and the compound flex spline 120 are assembled within the wave generator 110, the wave generator 110 can contact and engage a radially outward surface of compound flex spline 120 at two or more radially equal distant points, causing compound flex spline 120 to flex into an elliptical circumference within the wave generator 110.

The compound flex spline 120 includes a first internal ring gear 130 and a second internal ring gear 140. The second internal ring gear 140 is coaxial to the first internal ring gear 130 and may abut the first internal ring gear 130. In an embodiment, the first internal ring gear 130 and the second internal ring gear 140 may be integral. The first internal ring gear 130 and the second internal ring gear 140 are connected or integrated such that the first internal ring gear 130 and the second internal ring gear 140 rotate together at the same rate and do not rotate relative each other. As the harmonic wave generator 110 rotates in a first direction D1, the harmonic wave generator 110 causes the compound flex spline 120 to rotate in a second direction D2 opposite from the first direction D1. Thus, as the harmonic wave generator 110 rotates in the first direction D1, the first internal ring gear 130 and the second internal ring gear 140 rotate in the second direction D2. Because the first internal ring gear 130 and the second internal ring gear 140 do not rotate relative to each other, the harmonic wave generator 110 rotates both the first internal ring gear 130 and the second internal ring gear 140 at the same rate.

The first internal ring gear 130 includes radially-inward-extending teeth 132 and an internal diameter D3, as seen in FIG. 1. The second internal ring gear 140 includes radially-inward-extending teeth 142 and an internal diameter D4, as seen in FIG. 1. The internal ring gears 130, 140 may have different internal diameters D3, D4 and the thickness of the radially inward extending teeth 132, 142 may be the same. Alternatively, the internal ring gears 130, 140 may have the same internal diameters D3, D4 and thickness of the radially inward extending teeth 132, 142 may be different. Further, the first internal ring gear 130 may have a different number of radially inward extending teeth than the second internal ring gear 140. The difference in the number of radially inward extending teeth 132, 142 may be caused by a variety of factors, such as, for example, different internal diameters D3, D4, of the internal ring gear 130, 140, and different thicknesses of the radially inward extending teeth 132, 142 of the internal ring gears 130, 140. In an embodiment, the internal diameter D4 of the first internal ring gear 130 is about equal to the internal diameter D4 of the second internal ring gear 140 and the first internal ring gear 130 has a different number of teeth than the second internal ring gear 140. Advantageously, by keeping the internal diameter D4 of the first internal ring gear 130 about equal to the internal diameter D4 of the second internal ring gear 140, the first internal ring gear 130 and the second internal ring gear 140 see similar flexural stresses and also have similar fatigue stresses.

The first internal ring gear 130 and the second internal ring gear 140 may be made from relatively thin sheets of spring steel, or any other material with properties similar to spring steel. Because the first internal ring gear 130 and the second internal ring gear 140 can be made from spring steel, the first internal ring gear 130 and the second internal ring gear 140 are relatively thin, flexible, and elastic. The nature of the compound harmonic drive 100 creating a high ratio drive with fewer components is the factor in the size and torque to weight ratio. The thin section of the compound flex spline 120 is currently a requirement for a compound harmonic drive 100 to function within fatigue limits for the compound flex spline 120. The compound flex spline 120 may be made thicker utilizing a material that could flex repeatedly, have a hard surface, and have a high enough yield stress.

The first internal ring gear 130 and the second internal ring gear 140 may also be open on both sides, similar to hoops. Because the first internal ring gear 130 and the second internal ring gear 140 are open on both sides, the first internal ring gear 130 and the second internal ring gear 140 elastically deform more uniformly than a conventional flexible gears that have one open side and one closed side. Increasing the uniformity in the elastic deformation of the first internal ring gear 130 and the second internal ring gear 140 increases their torque load capacity. As described above, the wave generator 110 elastically deforms the first internal ring gear 130 and the second internal ring gear 140.

The first external gear 150 includes radially-outward-extending teeth 152 and an outer diameter D5, as seen in FIG. 1. The second external gear 170 includes radially-outward-extending teeth 172 and an outer diameter D6, as seen in FIG. 1. The external gears 150, 170 may have different outer diameters D5, D6 and the thickness of the radially outward extending teeth 152, 172 may be the same. Alternatively, the external gears 150, 170 may have the outer diameters D5, D6 and thickness of the radially outward extending teeth 152, 172 may be different. Further, the first external gear 150 may have a different number of radially-outward-extending teeth than the second external gear 170. The difference in the number of radially-outward-extending teeth may be caused by a variety of factors, such as, for example, different outer diameters D5, D6, of the external gear 150, 170 and different thicknesses of the radially outward extending teeth 152, 172 of the external gears 150, 170. In an embodiment, the outer diameter D5 of the first external gear 150 is about equal to the outer diameter D6 of the second external gear 170 and the first external gear 150 has a different number of teeth than second external gear 170.

The first external gear 150 is positioned within (i.e. radially inward from and surrounded by) the first internal ring gear 130 and meshes with the first internal ring gear 130. The first external gear 150 and the first internal ring gear 130 are both coaxial and concentric. The radially-outward-extending teeth 152 of the first external gear 150 extend radially outward from the first external gear 150 to mate with the radially-inward-extending teeth 132 of the first internal ring gear 130.

The second external gear 170 is positioned within (i.e. radially inward from and surrounded by) the second internal ring gear 140 and meshes with the second internal ring gear 140. The second external gear 170 and the second internal ring gear 140 are both coaxial and concentric. The radially-outward-extending teeth 172 of the second external gear 170 extend radially outward from the second external gear 170 to mate with the radially-inward-extending teeth 142 of the second internal ring gear 140.

The first internal ring gear 130 and the second internal ring gear 140 rotate in response to interaction between the wave generator 110, the first internal ring gear 130, the second internal ring gear 140, the first external gear 150, and the second external gear 170 when the wave generator 110 rotates. As mentioned above, the first external gear 150 has a different number of radially-outward-extending teeth than the second external gear 170, such that the first external gear 150 and the second external gear 170 can rotate at different rates when the wave generator 110 rotates the first internal ring gear 130 and the second internal ring gear 140.

The second external gear 170 can be connected at the apertures 176, seen in FIG. 3, to a ground, which is a rotationally neutral mounting location of the compound harmonic drive 100. The ground may be a base plate fixed within the cross-section of a wing structure. By connecting the second external gear 170 to a ground, the second internal ring gear 140 may rotate around the second external gear 170 while the second external gear 170 does not rotate. When the second external gear 170 is connected to ground, the first internal ring gear will rotate 130 causing the first external gear 150 to rotate around axis W. The first external gear 150 may be connected to an output at splines 156, as seen in FIGS. 2 and 3. The output may be such as, for example an aileron of an airplane wing. Additional internal ring gears and associated external gears may be added to the compound harmonic drive 100. Additional external gears may include a different number of external teeth from both the first external gear 150 and the second external gear 170, or additional external gears may include the same number of external teeth as the first external gear 150 to create a common but bifurcated output.

The following is a step-by-step description of how the compound harmonic drive 100 steps down rotational motion from the wave generator 110 to an output at the spline 156 of the first external gear 150. An input will rotate the wave generator 110 at a first rate in a first direction D1. The wave generator 110 rotates the second internal ring gear 140 at a second rate that is slower than the first rate, and in a second direction D2 opposite to the first direction D1. For example, if the second internal ring gear 140 has x teeth, and the second external gear 170 has x+1 teeth meshing with the x teeth of the second internal ring gear 140, then second internal ring gear 140 will rotate at 1/x the rate in the second direction D2 opposite the direction of rotation of the wave generator 30.

The first internal ring gear 130 rotates in the same direction (second direction D2) and at the same rate (second rate) as the second internal ring gear 140. However, the first internal ring gear 130 can have more teeth than the second internal ring gear 140 and/or the first external gear 150 can have more teeth than the second external gear 170. Because the first internal ring gear 130 and/or the first external gear 150 have a different number of teeth than the second internal ring gear 140 and the second external gear 170, and because the second external gear 170 is connected to a ground, the first external gear 150 within the first internal ring gear 130 rotates in the first direction at a third rate that is slower than the second rate. Expanding on the previous example, if the first internal ring gear 130 has y teeth, and first external gear 150 has y+1 teeth, the first external gear 150 will rotate in the first direction at approximately 1/y the rate of the second rate, and approximately 1/(y*x) the rate of the first rate, the first rate being the rate at which the wave generator 110 rotates. The first external gear 150 is connected to an output at the splines 156, thus the compound harmonic drive 100, in the example above, rotates the output at the splines 156 at approximately 1/(y*x) the rate of an input on the wave generator 110. In addition to stepping down the rate of rotation of an input on the wave generator 110, the compound harmonic drive 100 approximately steps up the torque from the input on the wave generator 110 in an inverse relationship to the step down in rate. Thus, in the above example, the compound harmonic drive 100 steps up the torque of an input on the wave generator 110 such that an output at the splines 156 delivers approximately (y*x) more torque than the input at the wave generator 110, albeit at a rate approximately (y*x) smaller. Similar to the first external gear 150, more external gears, can be meshed to the first internal ring gear 130 to produce one or more additional outputs, that rotate at rates different from the output on the splines 156. Because the compound harmonic drive 100 provides such a high step-down ratio while delivering high torque, the compound harmonic drive 100 is able to convert a high speed input provided by an electric motor to a more useful and manageable output speed and torque. Advantageously, the compound harmonic drive 100 is simple, small, and compact.

In view of the foregoing description, it will be recognized that the present disclosure provides numerous advantages and benefits. For example, the present disclosure provides the compound harmonic drive 100 with the first internal ring gear 130, the second internal ring gear 140, the first external gear 150 meshing with first internal ring gear 130, the second external gear 170 meshing with the second internal ring gear, and the wave generator 110 that rotates both the first internal ring gear 130 and the second internal ring gear 140. The first internal ring gear 130, the second internal ring gear 130, the first external gear 150, and the second external gear 170 produce within the compound harmonic drive 100 a high reduction ratio and high torque-to-weight ratio such that compound harmonic drive 100 is able to step-down the rotational rate of an electric motor while increasing the torque of the electric motor as it enters the compound harmonic drive 100 through the wave generator 110 and exits out through the splines 156 or another output. The compound harmonic drive 100 is also smaller in diameter than a conventional planetary gear drive with a reduction ratio and torque-to-weight ratio similar to the compound harmonic drive 100.

Referring now to FIG. 5, while referencing components of the compound harmonic drive 100 of FIGS. 1-4, FIG. 5 shows a flow process illustrating a method 500 of manufacturing the compound harmonic drive system 100 of FIG. 1-4, according to an embodiment of the present disclosure. At block 504, the first internal ring gear 130 and the second internal ring gear 140 are positioned within the wave generator 110. The first internal ring gear 130, the second internal ring gear 140, and the wave generator 110 are coaxial to each other. At block 506, the first external gear 150 is positioned within the first internal ring gear 130. The first external gear 150 meshes with the first internal ring gear 130 and is coaxial to the first internal ring gear 130, as discussed above. At block 508, the second external gear 170 is positioned within the second internal ring gear 140. The second external gear 170 meshes with the second internal ring gear 140 and is coaxial to the second internal ring gear 140, as discussed above. At block 510, the first external gear 150 is connected to an output structure, such as, for example, an aircraft aileron. At block 512, the second external gear 170 is connected to a ground, such as, for example, an aircraft structural frame.

While the above description has described the flow process of FIG. 5 in a particular order, it should be appreciated that unless otherwise specifically required in the attached claims that the ordering of the steps may be varied.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:
1. A compound harmonic drive, comprising:
  a compound flex spline comprising:
    a first internal ring gear, wherein the first internal ring gear is hoop shaped such that the first internal ring gear is open on a first side of the first internal ring gear and open on a second side of the first internal ring gear; and
    a second internal ring gear, the second internal ring gear being coaxial to the first internal ring gear, wherein the second internal ring gear is adjacent to the first internal ring gear with no components interposed between the second internal ring gear and the first internal ring gear, wherein the second internal ring gear is hoop shaped such that the second internal ring gear is open on a first side of the second internal ring gear and open on a second side of the second internal ring gear, and wherein the second side of the first internal ring gear abuts the first side of the second internal ring gear;
  a first external gear located within the first internal ring gear and coaxial to the first internal ring gear, the first external gear meshes with the first internal ring gear; and
  a second external gear located within the second internal ring gear and coaxial to the second internal ring gear, the second external gear meshes with the second internal ring gear,
  wherein the first internal ring gear and the second internal ring gear are composed of a flexible material, and
  wherein the wave generator can contact and engage a radially outward surface of the compound flex spline at more than two radially equal distant points, causing the compound flex spline to flex,
  wherein the first side of the first internal ring gear and the second side of the second internal ring gear are unaffixed,
  wherein the wave generator deforms the compound flex spline uniformly from the first side of the first internal ring gear to the second side of the second internal ring gear, and
  wherein an internal diameter of the first internal ring gear is about equal to an internal diameter of the second internal ring gear and the first internal ring gear has a different number of teeth than the second internal ring gear.

2. The compound harmonic drive of claim 1, wherein the first external gear includes radially-outward-extending teeth that mesh with radially-inward-extending teeth of the first internal ring gear.

3. The compound harmonic drive of claim 2, wherein the second external gear includes radially-outward-extending teeth that mesh with radially-inward-extending teeth of the second internal ring gear.

4. The compound harmonic drive of claim 3, wherein the first external gear includes a different number of radially-outward-extending teeth than the second external gear.

5. The compound harmonic drive of claim 3, further comprising:
a wave generator disposed radially outward from the first internal ring gear and the second internal ring gear and engaged with both the first internal ring gear and the second internal ring gear; and
a bearing element radially interposed between the harmonic wave generator and the first internal ring gear and the second internal ring gear,
wherein the first internal ring gear and the second internal ring gear rotate in response to interaction between the wave generator, the first internal ring gear, the second internal ring gear, the first external gear, and the second external gear when the wave generator rotates.

6. The compound harmonic drive of claim 5, wherein the first internal ring gear and the second internal ring gear rotate at the same rate.

7. The compound harmonic drive of claim 1, wherein the first internal ring gear and the second internal ring gear are integral.

8. A method of assembling a compound harmonic drive, the method comprising:
positioning a compound flex spline comprising a first internal ring gear and a second internal ring gear within a wave generator, the first internal ring gear, the second internal ring gear, and the wave generator being coaxial to each other, wherein the second internal ring gear is adjacent to the first internal ring gear with no components interposed between the second internal ring gear and the first internal ring gear, wherein the first internal ring gear is hoop shaped such that the first internal ring gear is open on a first side of the first internal ring gear and open on a second side of the first internal ring gear, wherein the second internal ring gear is hoop shaped such that the second internal ring gear is open on a first side of the second internal ring gear and open on a second side of the second internal ring gear, and wherein the second side of the first internal ring gear abuts the first side of the second internal ring gear;
positioning a first external gear within the first internal ring gear, the first external gear meshes with the first internal ring gear and is coaxial to the first internal ring gear;
positioning a second external gear within the second internal ring gear, the second external gear meshes with the second internal ring gear and is coaxial to the second internal ring gear,
wherein the first internal ring gear and the second internal ring gear are composed of a flexible material,
wherein the wave generator can contact and engage a radially outward surface of the compound flex spline at more than two radially equal distant points, causing the compound flex spline to flex,
wherein the first side of the first internal ring gear and the second side of the second internal ring gear are unaffixed,
wherein the wave generator deforms the compound flex spline uniformly from the first side of the first internal ring gear to the second side of the second internal ring gear,
wherein an internal diameter of the first internal ring gear is about equal to an internal diameter of the second internal ring gear and the first internal ring gear has a different number of teeth than the second internal ring gear.

9. The method of claim 8, further comprising:
connecting the first external gear to an output structure; and
connecting the second external gear to ground.

10. The method of claim 8, wherein the first external gear includes radially-outward-extending teeth that mesh with radially-inward-extending teeth of the first internal ring gear.

11. The method of claim 10, wherein the second external gear includes radially-outward-extending teeth that mesh with radially-inward-extending teeth of the second internal ring gear.

12. The method of claim 11, wherein the first external gear includes a different number of radially-outward-extending teeth than the second external gear.

13. The method of claim 8, wherein the first internal ring gear and the second internal ring gear rotate at the same rate.

14. The method of claim 8, wherein the first internal ring gear and the second internal ring gear are integral.

* * * * *